(12) United States Patent
Murmann et al.

(10) Patent No.: US 12,128,634 B2
(45) Date of Patent: Oct. 29, 2024

(54) RIVET CONNECTION AND METHOD FOR PRODUCING A RIVET CONNECTION

(71) Applicant: Continental Automotive GmbH, Hannover (DE)

(72) Inventors: Udo Murmann, Eppertshausen (DE); Sven Friedrich, Chemnitz (DE); Eric Brückner, Chemnitz (DE)

(73) Assignee: Continental Automotive GmbH, Hannover (DE)

( * ) Notice: Subject to any disclaimer, the term of this patent is extended or adjusted under 35 U.S.C. 154(b) by 534 days.

(21) Appl. No.: 16/825,660

(22) Filed: Mar. 20, 2020

(65) Prior Publication Data
US 2020/0215765 A1    Jul. 9, 2020

Related U.S. Application Data

(63) Continuation of application No. PCT/EP2018/074594, filed on Sep. 12, 2018.

(30) Foreign Application Priority Data

Sep. 21, 2017    (DE) .................. 10 2017 216 742.4

(51) Int. Cl.
*B29C 65/60* (2006.01)
*F16B 5/04* (2006.01)
*F16B 19/06* (2006.01)

(52) U.S. Cl.
CPC ............ *B29C 65/607* (2013.01); *F16B 5/045* (2013.01); *F16B 19/06* (2013.01)

(58) Field of Classification Search
CPC .. F16B 19/06; F16B 5/04; F16B 19/08; F16B 5/045; B29C 65/607

(Continued)

(56) References Cited

U.S. PATENT DOCUMENTS 3,458,618 A * 7/1969 Burns ................. B29C 66/8322
                                                    264/249
3,499,808 A * 3/1970 Obeda .................... B29C 66/21
                                                    156/580.2

(Continued)

FOREIGN PATENT DOCUMENTS

CN        101495253 A     7/2009
CN        201428675 Y     3/2010

(Continued)

OTHER PUBLICATIONS

Chinese Office Action dated Jan. 6, 2021 for the counterpart Chinese Patent Application No. 201880061228.8.

(Continued)

*Primary Examiner* — Flemming Saether

(57) ABSTRACT

A rivet connection has a hollow rivet composed of plastics material and connects a first component to a second component. The first component has a first surface and the second component has a second and third surface. The first surface and the second surface bear on one another. The second component has a first opening between the second and the third surface. The hollow rivet has a tubular component having a lateral wall, a cavity, a first end and a second end. Part of the tubular component is disposed in the first opening of the second component. The second end of the tubular component protrudes beyond the second component. The lateral wall of the tubular component adjacent the first opening of the second component is heated and compressed and configures an outwardly bulging region. Part of the outwardly bulging region contacts the third surface of the second component.

16 Claims, 4 Drawing Sheets

(58) Field of Classification Search
USPC .......................................................... 411/501
See application file for complete search history.

(56) References Cited

U.S. PATENT DOCUMENTS

| | | | |
|---|---|---|---|
| 3,544,143 A | 12/1970 | Ohlsson | |
| 3,754,310 A * | 8/1973 | Shea | F16B 19/10 264/249 |
| 5,120,175 A * | 6/1992 | Arbegast | F16B 19/06 411/902 |
| 5,164,133 A * | 11/1992 | Ishida | H05B 3/146 264/105 |
| 7,070,378 B2 * | 7/2006 | Grabowski | F16B 19/10 264/249 |
| 8,167,347 B2 * | 5/2012 | Parkinson | B29C 66/54 296/146.7 |
| 2002/0017744 A1 | 2/2002 | Lochner et al. | |
| 2004/0164124 A1 | 8/2004 | Lundstrom et al. | |
| 2012/0210558 A1 * | 8/2012 | Logan | F16B 17/008 403/280 |
| 2014/0230994 A1 * | 8/2014 | Riehm | B29C 66/81419 156/379.6 |

FOREIGN PATENT DOCUMENTS

| | | |
|---|---|---|
| CN | 101879572 A | 11/2010 |
| CN | 201786849 U | 4/2011 |
| CN | 102305319 A | 1/2012 |
| CN | 103600017 A | 2/2014 |
| CN | 106222394 A | 12/2016 |
| DE | 3932294 C1 | 11/1990 |
| DE | 19700518 A1 | 7/1998 |
| DE | 102006039658 A1 | 3/2008 |
| DE | 102013008831 B3 | 11/2014 |
| EP | 0212656 A1 | 3/1987 |
| EP | 0322999 A2 | 7/1989 |
| EP | 1180405 A2 | 2/2002 |
| JP | H07117134 A | 5/1995 |

OTHER PUBLICATIONS

Office Action dated Oct. 8, 2021 from corresponding Chinese patent application No. CN 201880061228.8.
Office Action dated May 14, 2018 from corresponding German Patent Application No. DE 10 2017 216 742.4.
International Search Report and Written Opinion dated Dec. 10, 2018 from corresponding International Patent Application No. PCT/EP2018/074594.

* cited by examiner a     b     c

RIVET CONNECTION AND METHOD FOR PRODUCING A RIVET CONNECTION

CROSS-REFERENCE TO RELATED APPLICATIONS

This U.S. patent application claims the benefit of PCT patent application No. PCT/DE2018/074594, filed Sep. 12, 2018, which claims the benefit of German patent application No. 10 2017 216 742.4, filed Sep. 21, 2017, both of which are hereby incorporated by reference.

TECHNICAL FIELD

The invention relates to a rivet connection and to a method for producing a rivet connection.

BACKGROUND

Rivet connections for connecting a first component to a second component, are known from the prior art, in which a tubular rivet by way of an internal pin is plug-fitted through openings of the components to be connected. The tubular rivet is deformed outside the components to be connected by pulling on the pin. Thus, connecting the two components to one another. This type of rivet is known as a so-called blind rivet.

Furthermore, known are rivet connections in which tubular round rivets composed of plastics material are plug-fitted through in each case one opening of a first component and one opening of a second component. The two ends of the rivet are deformed to form in each case one rivet head. One of the rivet heads herein may already have been formed prior to assembling the rivet through the two openings, while the second rivet head is deformed by heating the tubular end and placing thereon a forming tool after plug-fitting the rivet through the two openings of the components to be connected, the components to be connected thus being connected to one another.

In this deformation of the tubular end toward the rivet head the rivet head under certain circumstances is insufficiently linked to the remaining tube. A joint line with has a negative effect in terms of strength, visual appearance, and function may be created. The cause thereof lies in the minor thickness of the molten layer and a simultaneously high shear rate. The attempt at putting the entire rivet head volume in a sufficiently plasticized state and at avoiding said regions is unsuccessful.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A rivet connection having a hollow rivet is composed of plastics material and connects a first component to a second component. The first component has a first surface, and the second component has a second and a third surface. The first surface of the first component and the second surface of the second component herein bear on one another.

The second component has a first opening between the second and the third surface, wherein the hollow rivet has a tubular component having a lateral wall, a cavity, and a first end and a second end, wherein part of the tubular component is disposed in the first opening of the second component. The second end of the tubular component protrudes beyond the second component. The lateral wall of the tubular part, on the circumference thereof adjacent the first opening, is heated and compressed and thus configures an outwardly bulging region, wherein part of the outwardly bulging region contacts the third surface of the second component.

The tubular component, on account of the lateral introduction of energy into the lateral wall, can be plasticized directly above the second component such that, upon compression, the plasticized material may flow and form the outwardly bulging region without shear edges being created. No energy is introduced directly into the second component by the laser or lasers. The second component is largely spared on account of the energy of the laser or lasers being introduced into the tubular component directly from the side into the lateral wall. When cooling down, only parts of the outwardly bulging material dissipate part of the energy stored therein on account of the plastification to the second component. The stress on the second component on account of a thermal input is thus substantially less than in the case of infra-red heating of the rivet end. This is helpful when the second component is configured as a circuit board on which electronic and electromechanical components are disposed.

The first component can be designed as an electromechanical component, for example, which by way of the rivet connection is fastened to a circuit board as the second component. In one the method, the lateral wall of the rivet, on the circumference thereof laterally above the workpiece to be connected, is heated from the side by at least one laser until plastification, and by means of a forming tool is then compressed from above, thus from the second end of the tubular component, in the direction of the third surface.

The energy of the laser or lasers can be particularly well absorbed, and the plastification can be accelerated, when the plastics material contains carbon black particles.

The complexity in terms of assembling is significantly reduced when the tubular component is designed as part of the first component.

However, the rivet can also be designed as a discrete part having only said function. In this instance, the tubular component, or an extension of the tubular component, on the first end thereof has an expansion which is molded already in the production of the rivet. The first component in this instance furthermore has even a fourth surface, wherein a second opening through which the tubular component, or an extension of the tubular component, is guided is present between the first surface and the fourth surface.

The tubular component and the first opening, or the first and the second opening, respectively, are in each case designed so as to be round, since uniform plastification can be achieved in a particularly simple manner in this instance. However, oval or polygonal design embodiments are also possible. On account thereof, an anti-rotation safeguard is enabled even in the presence of only one rivet connection.

When the forming tool has a mandrel which is guided in the cavity of the tubular component, a situation is prevented in which the plasticized material when compressed can invade the cavity, the outward bulging of the tubular component thus being facilitated. This is prevented when the mandrel is introduced into the cavity already prior to heating.

The heating can take place in a homogeneous manner on account of the laser and the rivet being moved relative to one another.

The time required for heating the tubular components can be reduced when at least two lasers are present. On account thereof, the quality in terms of the plastification and thus of the rivet connection overall can be increased. Moreover, the required relative mutual movement is reduced. In the case of two lasers being present, the rivet being disposed therebetween, the rivet or the lasers, respectively, need only to be rotated by 180° in relation to the lasers, or to the rivet, respectively. It is furthermore possible for the beams of one or a plurality of lasers to be deflected by way of mirror systems, in particular parabolic mirrors, such that the tubular component can be plasticized along the entire circumference thereof. A relative movement between the tubular component and the lasers can be dispensed with when using at least two so-called line lasers. For example, when using two so-called line lasers, 180° of the circumference of the tubular component can in each case be irradiated and heated such that the complete circumference of the tubular component is plasticized.

The complexity in terms of assembling the rivet connection can be reduced when the tubular component is designed as part of the first component, since at least one fewer component is required, or a plurality of fewer components are required in the case of components having a plurality of rivet connections, and the riveting procedure per se is also simplified.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
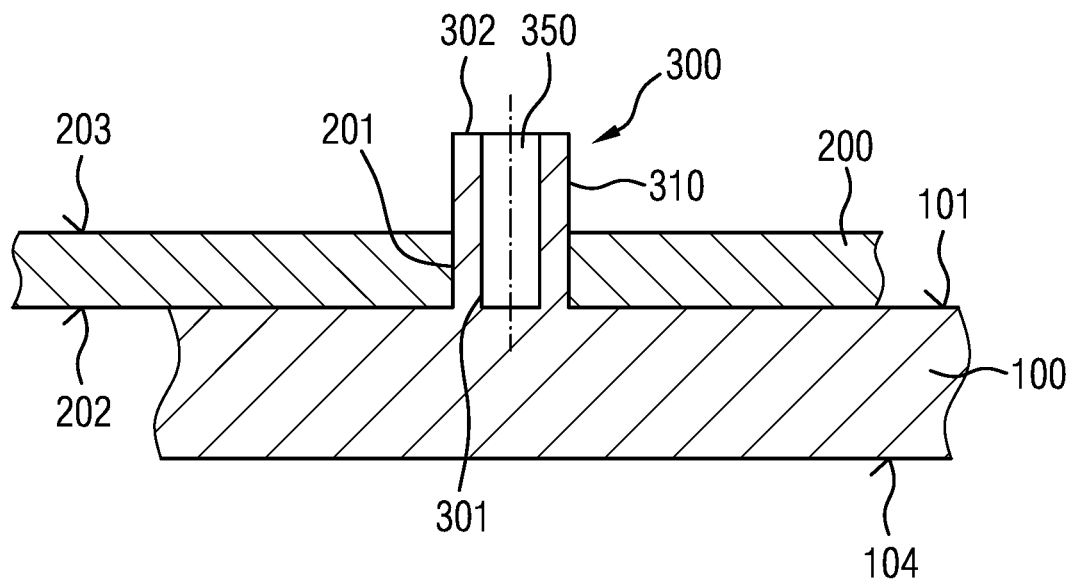
FIG. 1 shows a section through components which are to be connected and which have already been plug-fitted to one another.

A first component 100 and a second component 200 can be seen in FIG. 1. A tubular component 300 is configured as part of the first component 100. The tubular component in terms of the cross section thereof is configured so as to be annular, a lateral wall 310 enclosing a cavity 350.

The tubular component 300 has a first end 301 and a second end 302, wherein the second end 302 is the most remote from a first surface 101 of the first component 100.

The first component furthermore has even a fourth surface 104 which lies so as to be parallel with the first surface 101, wherein the parallelism is not mandatory.

The second component has a second surface 202, a third surface 203, and a first opening 201 through which the tubular component 300 is plug-fitted such that the first opening 201 in FIG. 1 is obscured by the tubular component 300, wherein the diameter of the first opening is somewhat larger than the external diameter of the tubular component such that a clearance fit results between said components.

The second component 200 by way of the second side 202 thereof bears on the first side 101 of the first component 100.

Figure 2:
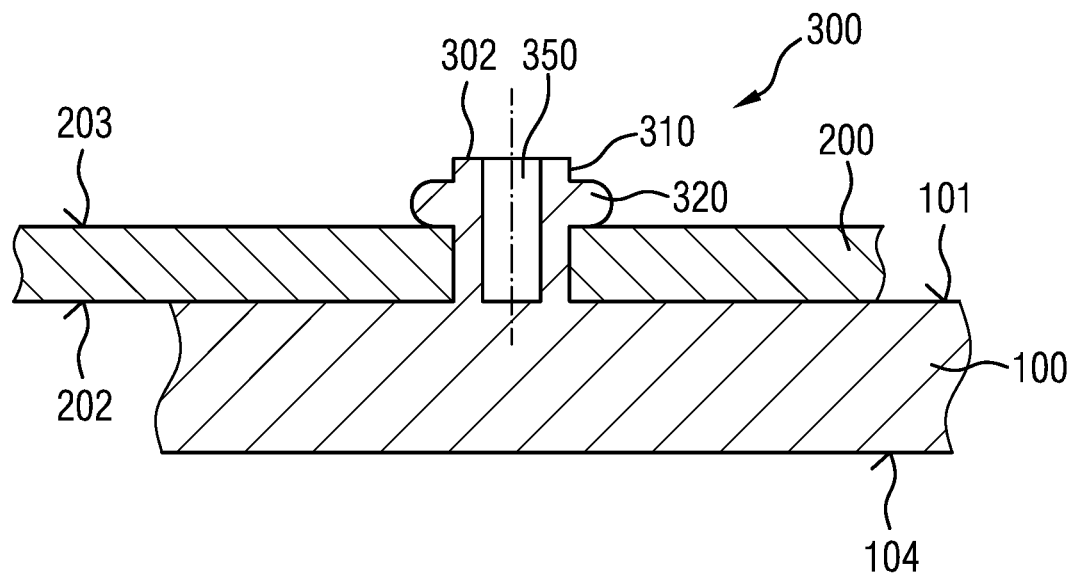
FIG. 2 shows a section of the components from FIG. 1 in the riveted state.

FIG. 2 differs from FIG. 1 in that the lateral wall 310 of the tubular component 300, on the wall 310 of the latter along the circumference of said component 300 above the third surface 203 of the first, has been heated and then compressed from above in such a manner that an outwardly bulging region 320 which partially contacts the third surface 203 of the second component is formed, the second end 302 of the tubular component 300 now being situated closer to the third surface of the second component 200.

Figure 3:
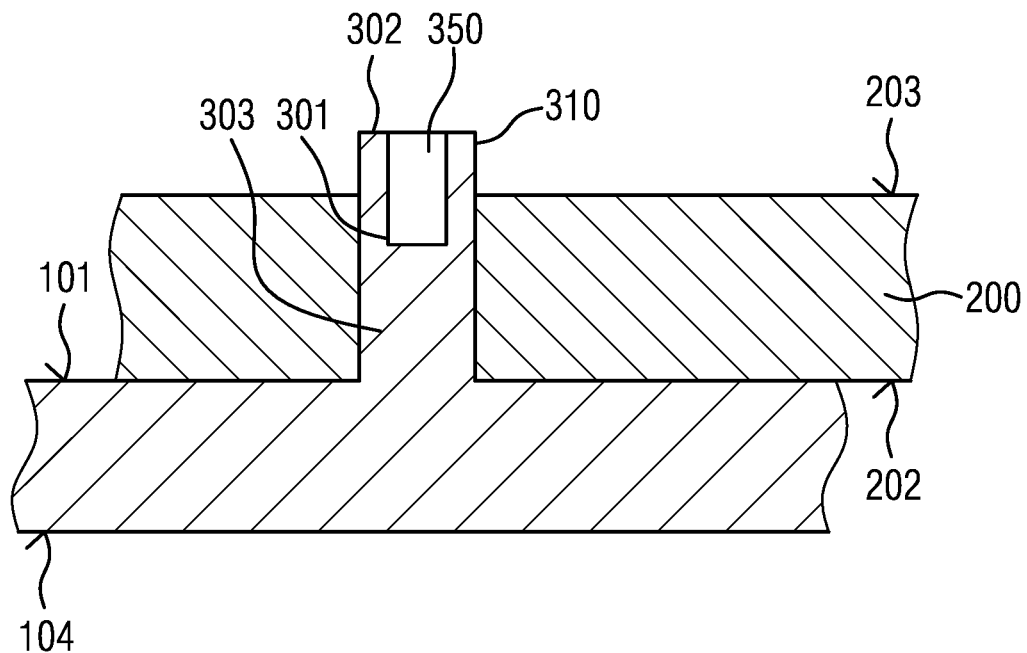
FIG. 3 shows a section through a slight variation of the components from FIG. 1.

FIG. 3 differs from FIG. 1 in that the second component 200 has a greater height and the tubular component is correspondingly adapted so that the latter still protrudes beyond the third surface of the second component 200.

The tubular component is connected to the first component 100 by way of an extension 303. In principle, it would also be possible for the tubular component to be designed up to the first surface 101 of the first component, this not having any influence on the deformation capability of the tubular component above the third surface of the second component. The use of the extension 303 does, however, may render the connection more stable and easier to produce, since the cavity 350 is not of excessive size.

Figure 4:
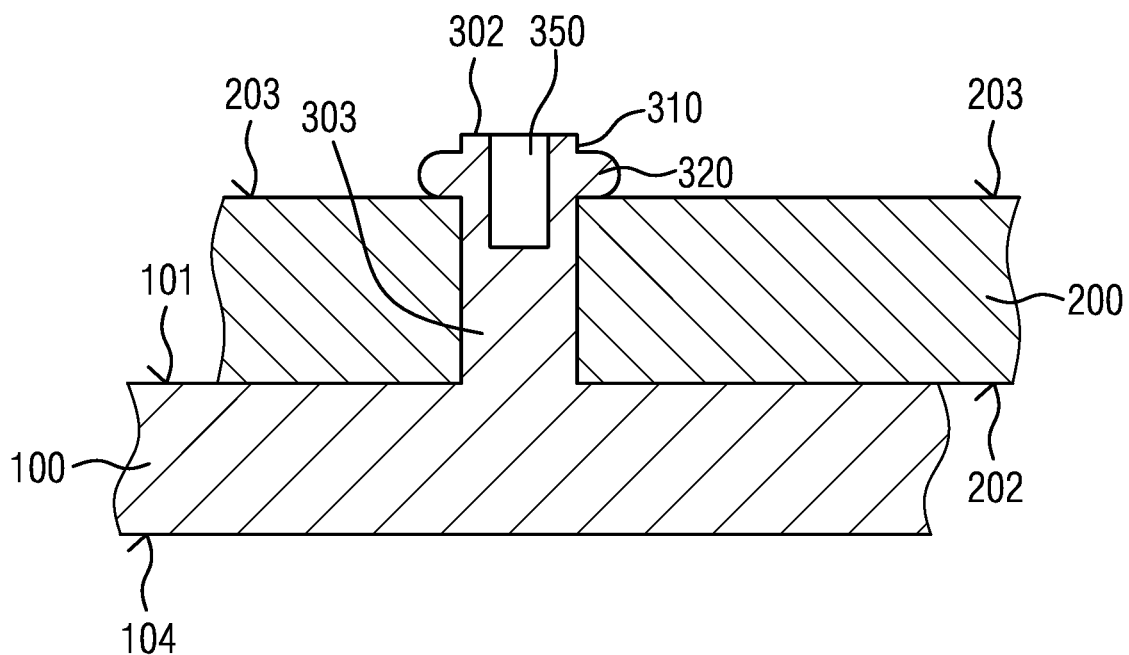
FIG. 4 shows a section through the components from FIG. 3 in the riveted state.

The wall 310 in FIG. 4 is shaped so as to form the outwardly bulging region 320 such that the rivet connection is implemented between the first component 100 and the second component 200. The explanations set forth in the context of FIG. 2 apply in an analogous manner.

Figure 5:
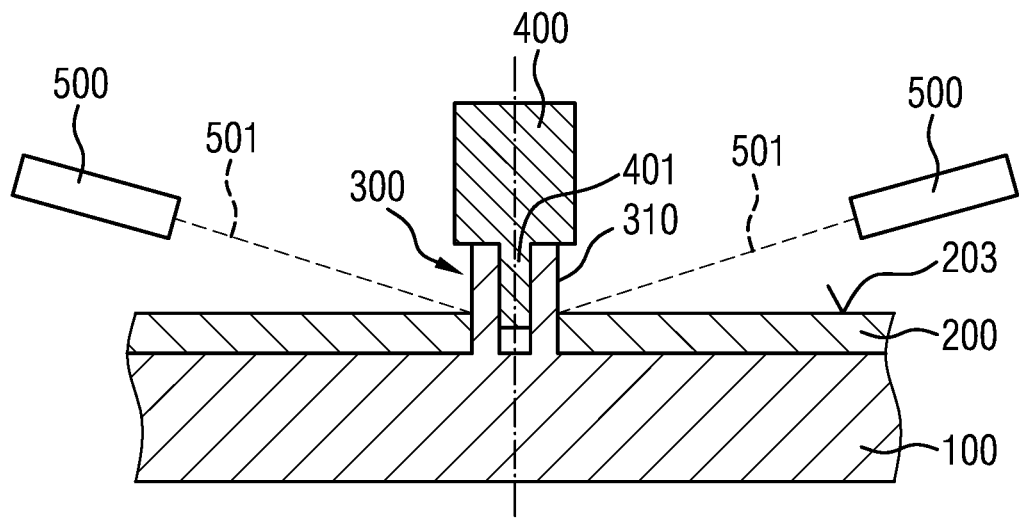
FIG. 5 shows a basic diagram of an exemplary embodiment of two components to be connected while heating by means of two lasers.

Apart from the first component 100 having the tubular component 300, and from the second component 200 having the third surface 203, a forming tool 400 having a mandrel 401 and two lasers 500 can be seen in FIG. 5. The lasers 500 emit laser beam 501 toward the lateral wall 310 of the tubular component 300, above the third surface 203 of the second component 200.

The lasers herein are rotated relative to the tubular component 300 such that the lateral wall 310 along the entire circumference thereof is heated until a region of the lateral wall 310 above the third surface of the second component 200 and below the second end 302 of the tubular component is completely plasticized. Then, as is illustrated in FIG. 6, by moving the forming tool 400 in the direction of the third surface of the second component 200, compresses the lateral wall such that the outwardly bulging region 320 results, the latter partially contacting the third surface 203 of the second component 200 and, after the cooling of the outwardly bulging region, implementing the rivet connection.

Figure 6:
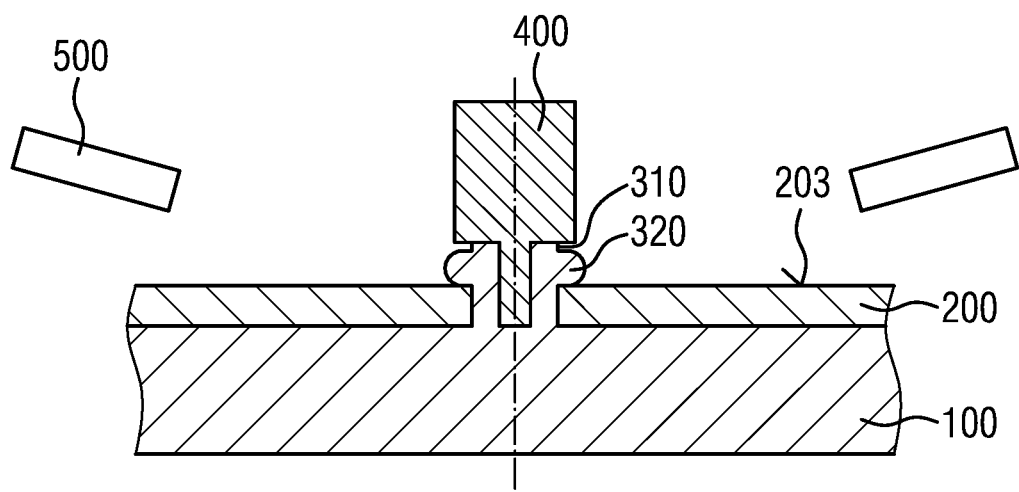
FIG. 6 shows a basic diagram of the exemplary embodiment from FIG. 5 after compressing of the plasticized rivet has taken place.

In the exemplary embodiment illustrated in FIGS. 5 and 6, having two lasers 500, the lasers have to be rotated by 180° relative to the tubular component 300 so as to be able to plasticize the entire circumference of the lateral wall 310 of the tubular component 300; in the case of only one laser being present, a relative rotation by 360° is required.

However, the use of a single laser does require more time until the lateral wall 310 in the region above the second component 200 is plasticized. It is also possible for the laser or lasers to be left in terms of the position thereof and for the tubular component 300 to be correspondingly rotated such that the lateral wall 310 is sufficiently plasticized. A relative movement between the tubular component 300 and the lasers 500 can be dispensed with when using at least two so-called line lasers. For example, when using two so-called line lasers, 180° of the circumference of the tubular component can in each case be irradiated and heated such that the complete circumference of the tubular component is plasticized.

It can be seen in FIGS. 2, 4, and 6 that part of the lateral wall 310 at the second end 302 of the tubular component 300 retains the original shape thereof, since said region has not been plasticized. The mandrel 401 of the forming tool 400 prevents a situation in which plasticized material of the lateral wall 310 makes its way into the cavity 350 before and during the compressing procedure. The mandrel 401 reaches a travel limit when the mandrel 401 contacts the bottom of the tubular component 300 during the forming process, as shown in FIG. 6. The plasticized material is thus completely used for configuring the outwardly bulging region 320.

Figure 7:
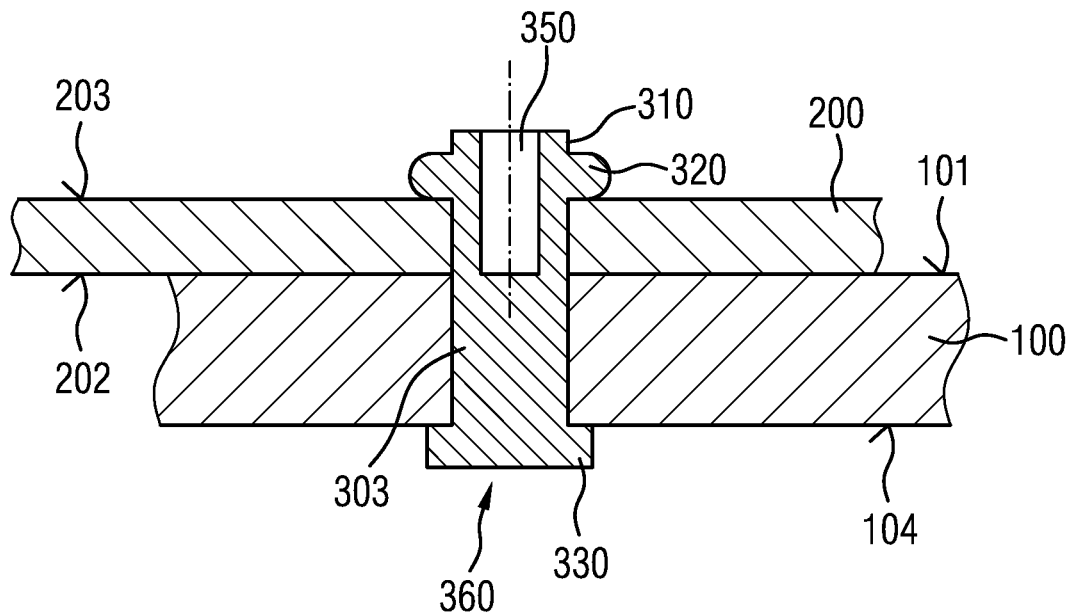
FIG. 7 shows a section through a further exemplary embodiment in the riveted state.
Figure 8:
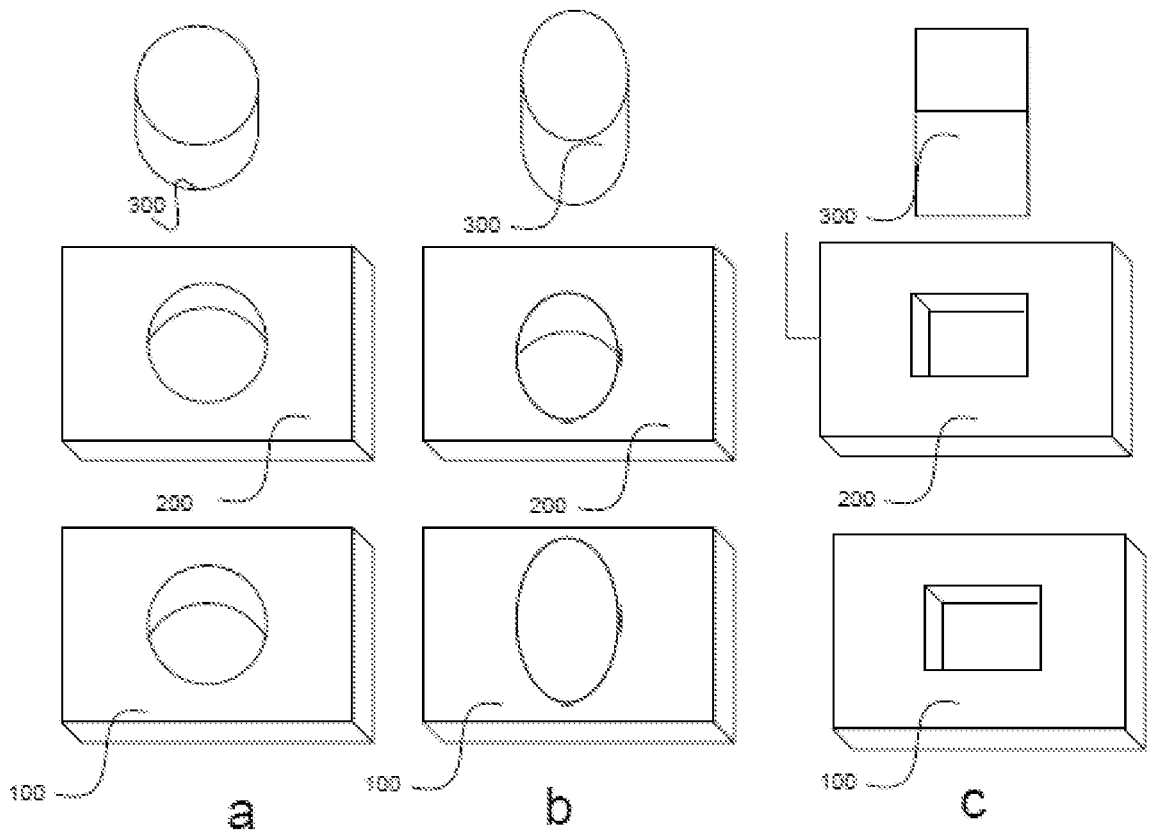
FIGS. 8a-c shows a partial perspective view of the tubular component, the second opening of the first component, and the first opening of the second component having round, oval, and polygonal shapes.

The rivet connection in FIG. 7 differs from the rivet connection in FIG. 4 in that the tubular component and the extension are designed as a separate hollow rivet 360 which even has an expansion 330. In order for the separate hollow rivet 360 to be able to connect the first and the second component 100, 200 to one another, the first component has a second opening, wherein the separate hollow rivet is plug-fitted through the first opening 201 of the second component, and through the second opening of the first component 100, until the expansion 330 contacts the fourth surface of the first component, the riveting then taking place as has been described above in the context of FIGS. 1 to 6.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A plastic rivet connection comprising:
a first component having a first surface;
a second component having a second and a third surface and connected to the first component with a hollow rivet, such that the first surface of the first component and the second surface of the second component bear on one another;
a tubular component of the first component having a lateral wall a first end and a second end, wherein the second end defines a cavity;
a first opening, defined by the second component, located between the second and the third surface, wherein part of the tubular component is disposed in the first opening of the second component such that the second end of the tubular component protrudes beyond the second component;
wherein the lateral wall of the tubular component, along the circumference thereof adjacent the first opening above the third surface of the second component, is heated and compressed wherein the lateral wall at the second end of the tubular component is not plasticized and retains an original shape thereof;
an outwardly bulging region on the lateral wall of the tubular portion, wherein part of the outwardly bulging region contacts the third surface of the second component, wherein the outwardly bulging region is spaced apart from the second end; and
wherein a bottom of the tubular component defining the cavity is a travel limit during the formation of the outwardly bulging region.

2. The rivet connection as claimed in claim 1, wherein a plastics material comprises carbon black particles.

3. The rivet connection as claimed in claim 1, wherein the tubular component is integral to the first component.

4. The rivet connection as claimed in claim 1, wherein the tubular component at the first end thereof is one of widened to form an expansion and connected to an expansion by an extension.

5. The rivet connection as claimed in claim 4, wherein the first component has a fourth surface and a second opening which leads from the first surface to the fourth surface, in that one of the tubular component and the extension of the tubular component is guided through the second opening of the first component, and the expansion contacts the fourth surface of the first component.

6. The rivet connection as claimed in claim 5, wherein the tubular component, the second opening of the first component, and the first opening of the second component are in each case one of: round, oval, and polygonal.

7. The rivet connection as claimed in claim 1, wherein the tubular component and the first opening of the second component are one of round, oval, or polygonal.

8. The rivet connection as claimed in claim 1, wherein the second end of the tubular component is not plastically deformed.

9. A method for connecting a first component to a second component with a plastic rivet comprising:
forming a tubular component on protruding from a first surface of the first component such that the tubular component has a lateral wall, a cavity and a first end and a second end;
plug-fitting the second end of the tubular component through a first opening defined by the second component such that the second end of the tubular component protrudes beyond a third surface the second component and the first surface of the first component bears on a second surface of the second component;
heating the lateral wall of the tubular component along the circumference thereof, above and adjacent a third surface of the second component and below the second end with at least one laser until plastification; and
compressing the tubular component from the second end thereof with a forming tool in such a manner that the compressed material of the tubular component forms an outwardly bulging region on the lateral wall and spaced apart from the second end which retains the original shape thereof, wherein the bottom of the tubular component defining the cavity is a travel limit for the forming tool, therein the outwardly bulging portion partially contacts the third surface of the second component.

10. The method as claimed in claim 9, wherein the plastics material comprises carbon black particles.

11. The method as claimed in claim 9, further comprising guiding a mandrel of the forming tool in the cavity of the tubular component.

12. The method as claimed in claim 11, wherein the mandrel is introduced into the cavity of the tubular component prior to heating.

13. The method as claimed in claim 9, further comprising moving the laser and the rivet relative to one another.

14. The method as claimed in claim 9, wherein at least two lasers are used per rivet for plastification.

15. The method as claimed in claim 9, wherein the tubular component is integral to the first component.

16. The method as claimed in claim 9, further comprising forming a rivet head in the form of an outwardly bulging region on one of the first end of the tubular component and on an extension of the tubular component.

\* \* \* \* \*